United States Patent
Ajmeer et al.

(10) Patent No.: US 12,114,406 B2
(45) Date of Patent: Oct. 8, 2024

(54) DETECTION AND CORRECTION OF A DE-SYNCHRONIZATION OF A LUMINAIRE

(71) Applicant: SIGNIFY HOLDING B.V., Eindhoven (NL)

(72) Inventors: Ahamed Rafik Ajmeer, Coimbatore (IN); Jagadish Dhanamjayam, Sydney (AU); Mainuddin Nadaf, Bangalore (IN)

(73) Assignee: SIGNIFY HOLDING B.V., Eindhoven (NL)

( * ) Notice: Subject to any disclaimer, the term of this patent is extended or adjusted under 35 U.S.C. 154(b) by 116 days.

(21) Appl. No.: 17/928,047

(22) PCT Filed: Jun. 11, 2021

(86) PCT No.: PCT/EP2021/065764
§ 371 (c)(1),
(2) Date: Nov. 28, 2022

(87) PCT Pub. No.: WO2021/254898
PCT Pub. Date: Dec. 23, 2021

(65) Prior Publication Data
US 2023/0284359 A1 Sep. 7, 2023

(30) Foreign Application Priority Data

Jun. 17, 2020 (IN) .............................. 202041025483
Aug. 26, 2020 (EP) .................................... 20192897

(51) Int. Cl.
H05B 47/00 (2020.01)
H05B 47/115 (2020.01)
(Continued)

(52) U.S. Cl.
CPC ......... *H05B 47/155* (2020.01); *H05B 47/115* (2020.01); *H05B 47/19* (2020.01)

(58) Field of Classification Search
CPC .... H05B 47/155; H05B 47/19; H05B 47/115; H05B 47/175; Y02B 20/40
See application file for complete search history.

(56) References Cited

U.S. PATENT DOCUMENTS 10,278,248 B2 4/2019 Harbers et al.
10,405,404 B1 9/2019 Trickler et al.
(Continued)

FOREIGN PATENT DOCUMENTS

EP 3300459 A1 3/2018

*Primary Examiner* — Tuan T Lam

(57) ABSTRACT

The invention relates to a luminaire (1*d*) connected to a plurality of further luminaires (1*a-c*, 2*a-e*) allocated to at least one group via a network. In order to detect and correct a de-synchronization, the luminaire (1*d*) is configured to (i) receive a status message from each of the further luminaires (1*a-c*, 2*a-e*), each status message including status information indicating a current status of the respective luminaire (1*a-c*; 2*a-e*) and trigger information about a trigger that prompted the respective luminaire (1*a-c*; 2*a-e*) to adopt the current status, (ii) select at least some of the received status messages based on the trigger information included therein, and (iii) compare the selected status messages and change its own status to a new status based on the comparison. Further, the invention is related to a corresponding method for changing the status of the luminaire (1*d*).

9 Claims, 2 Drawing Sheets

(51) Int. Cl.
*H05B 47/155* (2020.01)
*H05B 47/19* (2020.01)

(56) References Cited

U.S. PATENT DOCUMENTS

| | | |
|---|---|---|
| 2012/0091895 A1 | 4/2012 | De Groot |
| 2019/0008021 A1 | 1/2019 | Somaraju |
| 2022/0210715 A1* | 6/2022 | Deixler ............... H04L 41/0853 |
| 2023/0087854 A1* | 3/2023 | Yu .......................... G06F 3/0481 |
| | | 367/117 |
| 2023/0199933 A1* | 6/2023 | Graff ..................... H05B 47/11 |
| | | 315/70 |
| 2023/0276559 A1* | 8/2023 | Graff ................... H05B 47/165 |
| | | 315/86 |

\* cited by examiner

DETECTION AND CORRECTION OF A DE-SYNCHRONIZATION OF A LUMINAIRE

CROSS-REFERENCE TO PRIOR APPLICATIONS

This application is the U.S. National Phase application under 35 U.S.C. § 371 of International Application No. PCT/EP2021/065764, filed on Jun. 11, 2021, which claims the benefits of European Patent Application No. 20192897.5, filed on Aug. 26, 2020, and Indian Patent Application No. 202041025483, filed on Jun. 17, 2020. These applications are hereby incorporated by reference herein.

FIELD OF THE INVENTION

The invention is generally related to the lighting devices which are connected to each other in a communication network. More specifically, the invention relates to a luminaire connected to a plurality of further luminaires allocated to at least one group via a network and to a method for changing a status of a luminaire connected to a plurality of further luminaires allocated to at least one group via a network.

BACKGROUND OF THE INVENTION

In networks comprising a plurality of lighting devices, such as luminaires, sensors (e.g. occupancy sensors) and input devices (e.g. light switches), the lighting devices may be allocated to different groups such that the lighting states of the devices included in the same group can be jointly controlled so that they are in synchronization to each other. In related exemplary configurations, each group may include lighting devices arranged in a certain area of a room, building or public space. In such a configuration, the lighting devices may, for example, be operated such that the luminaires in a group associated with an area occupied by one or more subjects have a higher lighting level than luminaires in groups associated with unoccupied areas. Such an operation of the luminaires particularly allows for saving energy.

The synchronization within a group of a such a network is achieved in that control messages for adjusting the lighting state of the luminaires, such as messages of a sensor indicating an occupancy of an area associated with a certain group, are sent to all luminaires of the group, typically in a multicast transmission. However, a control message may not be correctly received by one or more individual luminaires included in a group, e.g. due to a routing failure in the network. In this case, the affected luminaires, which do not receive the control message, are not synchronized with the other luminaires of the group. As a possible result, these luminaires may maintain a lower lighting level in case the control message instructs the luminaires to increase their lighting level (e.g. due to a detected occupancy of the area associated with the group when this area was previously unoccupied), or they may maintain a higher lighting level in case the control message instructs the luminaires to decrease their lighting level (e.g. when it is detected that the area associated with the group is no longer occupied after a previous occupancy).

One possible approach to detect de-synchronized lighting devices and re-synchronize them with their groups is applicable in a lighting network having a central controller which maintains the intended lighting status of each luminaire included in the network. In such a lighting network, each luminaire may exchange status information with the central controller in order to determine whether or not the luminaire is operating as intended. However, lighting networks are often configured in accordance with a distributed architecture in which the lighting devices directly communicate with each other to exchange control commands without involving a central controller. As a consequence, these networks do usually not include a central device which maintains the status of the luminaires. Therefore, the aforementioned approach for detecting de-synchronized luminaires is not applicable in these networks.

Consequently, there is a need for another approach for detecting and re-synchronizing lighting devices which are out of synchronization with their group, which is also applicable in a lighting network that does not include a central device monitoring the status of the luminaires.

This is even more true in view of the fact that distributed lighting networks often bear a higher risk for de-synchronized lighting devices than lighting networks having a centralized architecture, at least when the control messages for the groups of devices are transmitted using multicast messages. In centralized networks, such messages can be sent using an acknowledgement-based communication protocol in such a way that the sender re-transmits a message if it does not receive positive acknowledgements of the receipt of the message from the intended recipients. Hereby, it can be ensured that all intended recipients correctly receive the message. However, in distributed networks, multicast messages are often sent using unacknowledged transmission which results in an increased risk of transmission failures.

Distributed lighting networks are typically configured as mesh networks, such as for example wireless mesh networks according to the Zigbee or Bluetooth specification. In a mesh network, the nodes connect directly and dynamically to as many other nodes as possible and cooperate with each other to route messages to their intended recipients. Due to the open and dynamic nature of such a network, the nodes do typically not have complete information about the other nodes in the network. Especially in such a network, an unacknowledged transmission is often more efficient. In fact, an acknowledged transmission would not ensure that all recipients correctly receive a message because the sender of a multicast message does not know all intendent recipients of such a message from which it has to expect an acknowledgement of receipt.

SUMMARY OF THE INVENTION

It is therefore an object of the invention to allow for a detection and correction of a de-synchronized luminaire in a distributed lighting network, which does not include a central device managing the status of the luminaires included in the lighting network.

According to one aspect, the invention suggests a luminaire connected to a plurality of further luminaires allocated to at least one group via a network. The luminaire is configured to (i) receive a status message from each of the further luminaires, each status message including status information indicating a current status of the respective luminaire and trigger information about a trigger that prompted the respective luminaire to adopt the current status, (ii) select at least some of the received status messages based on the trigger information included therein, (iii) compare the selected status messages and (iv) change its own status to a new status based on the comparison. The status of the luminaire or the status of a further luminaire, which is indicated in the status messages from this luminaire, may particularly comprise a lighting level.

By receiving and evaluating the status messages from further luminaires of the network, the luminaire can detect a de-synchronization from the further luminaires on its own. This allows for detecting a de-synchronization in a network which does not include a central device managing the status of the luminaires included in the network. Moreover, by taking the trigger information into consideration in the selection of the status messages which are used for detecting and correcting a de-synchronization, it is possible to distinguish between status messages originating from luminaires which are synchronized with other luminaires from status messages originating from luminaires which are not synchronized with other luminaires. For the detection and correction of a de-synchronization of the luminaire, the latter status messages are preferably not taken into account. This allows for a reliable detection and correction of a de-synchronization.

In one embodiment, the trigger information included in each status message received from a further luminaire is indicative of whether the trigger relates to all luminaires of a group or is only valid for the respective further luminaire. On this basis, it is possible to reliable identify status messages originating from synchronized further luminaires—such status messages will typically indicate a trigger reason relating to all luminaires of a group— and to distinguish such status messages from those originating from de-synchronized luminaires—which will often indicate a trigger reason relating only to the luminaire sending the status message.

The trigger information configured in the aforementioned way can particularly be used in order to select the status messages which are compared in order to detect and correct a desynchronization of the luminaire. In a related embodiment, the luminaire is included in an allocated group and is configured to select status messages for the comparison, which include trigger information indicative of a trigger relating to all luminaires of the allocated group and which do not include trigger information indicative of a trigger that is only valid for the luminaire having sent the respective status messages.

The trigger information included in the status messages may particularly specify the trigger reasons that prompted the luminaires to change to the status indicated in the status messages. When the luminaires are controlled in groups using occupancy sensors, as it is often the case, possible trigger reasons include an occupancy of an area assigned to a certain group of luminaires, which may be detected by an occupancy sensor. For instance, such a detected occupancy of a certain area may prompt all luminaires of the group assigned to the area to operate at a first lighting level. Moreover, it may prompt all luminaires of a neighboring group to operate at a second lighting level, which is lower than the first lighting level.

Particularly in view of a control of the luminaires of such a type, the information indicative of a trigger relating to all luminaires of the allocated group specifies a detection of an occupancy of an area assigned to the allocated group and/or a detection of an occupancy of an area assigned to a group of luminaires differing from the allocated group. The group differing from the allocated group may particularly be a neighboring group of the allocated group, when an occupancy of the area of the neighboring group prompts the luminaires of the allocated group to operate at a certain lighting level.

Further, the trigger information included in the status messages may specify a reception mode for the trigger that prompted the luminaires to the status indicated in the status messages. For instance, such triggers may be messages including control commands and/or notifying about a detected occupancy of a certain area. Such messages may be received via groupcast or broadcast transmissions which are addressed to luminaires of one or more groups. Likewise, such messages may be received via unicast transmissions, which are addressed to individual luminaires only. Moreover, control commands relating to individual luminaires may be input manually only.

In view of reception modes of such a type, one embodiment includes that the information indicative of a trigger that is only valid for one further luminaire having sent the status information specifies a reception of a message via a unicast transmission and/or a manual control input relating to the respective luminaire.

In a further embodiment, the luminaire is configured to check whether a number of the selected status messages greater than a predetermined threshold include identical status information and/or corresponding trigger information, and to change its status to a new status selected in accordance with this status information or trigger information, if the check is affirmative. When a number of the selected status messages greater than the predetermined threshold includes identical status information and/or trigger information corresponding to each other, there is a high likelihood that the luminaires having sent these status messages are intentionally synchronized with each other. Therefore, the new status of the luminaire can be determined based on this status information or the trigger information. In such a way, a de-synchronization of the luminaire can reliably be corrected. In the aforementioned check, trigger information may be regarded as corresponding to each other if they are identical. In one embodiment, trigger information may also be regarded as corresponding to each other, if they do not conflict with each other. This may particularly be the case if they can coexist in a group of synchronized luminaires.

A de-synchronization can particularly be detected and corrected on the basis of status messages received from further luminaires of the group allocated to the luminaire carrying out the detection and correction. However, for instance, in case of a simultaneous control of multiple groups of luminaires in response to detected occupancies of certain areas, a de-synchronization can likewise be detected and corrected on the basis of status messages received from luminaires of other groups.

In one embodiment, the luminaire is therefore configured to obtain status messages from further luminaires not assigned to the allocated group, and to determine the new status at least on the basis of these status messages. This determination may particularly be carried out in a second step in case the number of selected status messages received from the luminaires of the allocated group, which include identical status information and/or trigger information corresponding to each other, is not greater than the threshold. By additionally taking the status messages from luminaires of one or more other group(s) into consideration, a detection and correction of a de-synchronization may be also be possible in this situation.

In a related embodiment, the luminaire is configured to select status messages from the further luminaires not assigned to the allocated group, which do not include trigger information indicative of a trigger that is only valid for the luminaire having sent the respective status messages, and to determine the new status on the basis of the selected status messages received from the further luminaires not assigned to the allocated group. Optionally, the status messages received from the luminaires of the allocated group may additionally be taken into consideration in the determination of the new status and selected in order to determine the new status.

In a further related embodiment, the luminaire is configured to check whether a number of the selected status messages greater than a predetermined threshold include trigger information agreeing with each other, and to change its status to a new status selected in accordance with this trigger information, if the check is affirmative.

If the selected status messages used for determining the new status in this embodiment only include the status messages received from luminaires of one group, which does not correspond to the allocated group, the trigger information included in these messages may have to be identical in order to be regarded as agreeing with each other. Optionally, trigger information, which do not conflict with each other, may also be regarded as agreeing with to each other. In case the selected status messages used for determining the new status in this embodiment include status messages received from luminaires of multiple groups including the allocated groups, trigger information included in status messages received from luminaires of different groups do not have to be identical in order to be regarded as agreeing with each other. For such status messages, the included trigger information has to be in agreement in order for them to be regarded as agreeing with each other. For instance, this is the case for a status message from a luminaire of a first group, which indicates a detected occupancy of an area assigned to this group as a trigger, and a status message from a luminaire of a neighboring group, which indicates a detected occupancy of the first area as a trigger.

The luminaire may be connected to the further luminaires via a distributed communication network, particularly a mesh network. Moreover, the luminaire may be configured to obtain the status messages from the further luminaires by retrieving the status messages from the further luminaires, particularly by transmitting a related request to the further luminaires via a multicast transmission. The multicast transmission may be a groupcast transmission addressed to all luminaires of a group or a broadcast transmission addressed to all luminaires of the network.

In accordance with a further aspect, the invention suggests a method for changing a status of a luminaire connected to a plurality of further luminaires allocated to at least one group via a network. The method comprises: (i) receiving a status message from each of the further luminaires, each status message including status information indicating a current status of the respective luminaire and trigger information about a trigger that prompted the respective luminaire to adopt the current status, (ii) selecting at least some of the received status messages based on the trigger information included therein, (iii) comparing the selected status messages and (iv) changing its own status to a new status based on the comparison.

It shall be understood that the luminaire of claim 1 and the method of claim 13 have similar and/or identical preferred embodiments, in particular, as defined in the dependent claims.

It shall be understood that a preferred embodiment of the present invention can also be any combination of the dependent claims or above embodiments with the respective independent claim.

These and other aspects of the invention will be apparent from and elucidated with reference to the embodiments described hereinafter.

DETAILED DESCRIPTION OF EMBODIMENTS

Figure 1:
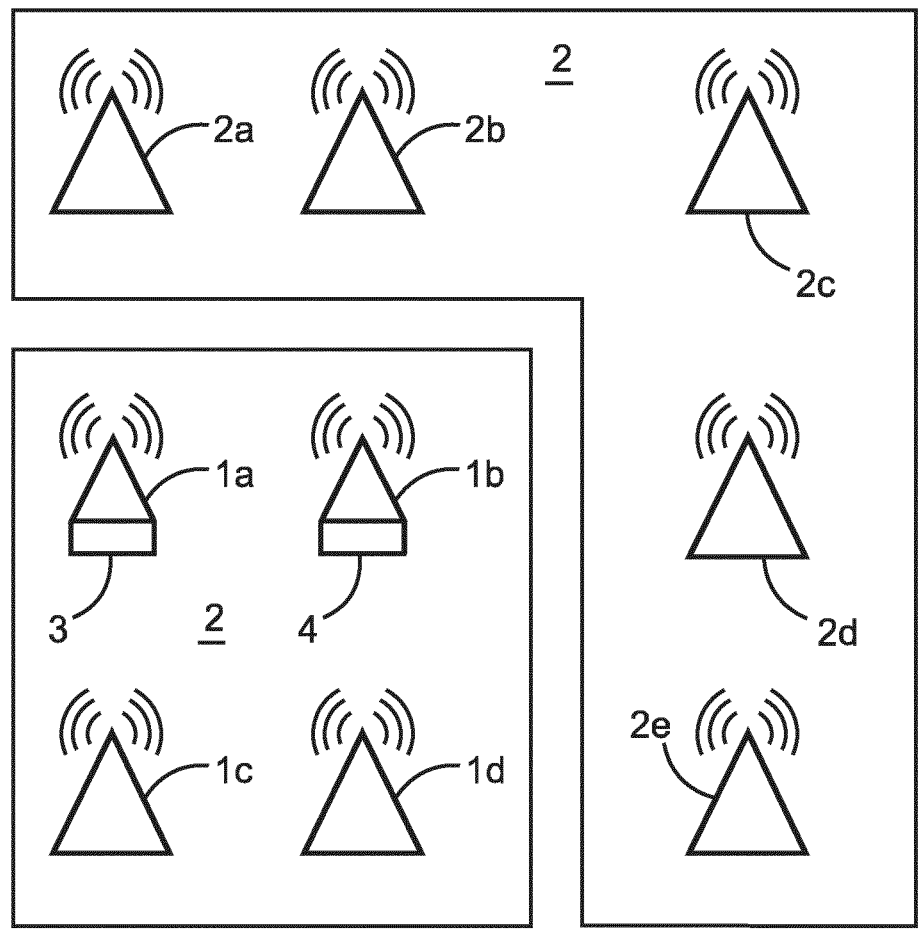
FIG. 1 schematically and exemplarily shows luminaires connected to each other in a distributed communication network, and FIG. 2 schematically and exemplarily shows steps of a procedure for detecting and correction a de-synchronization of a luminaire with respect to other luminaires of a group.

FIG. 1 schematically and exemplarily shows luminaires 1a-d, 2a-e, which are connected to each other in a communication network having a distributed network architecture. The communication network may particularly be a wireless mesh network, which may be configured according to the Zigbee or Bluetooth specification, for example. However, in further embodiments, the communication network may be configured in another way.

The luminaires 1a-d, 2a-e are assigned to different groups. In the example shown in FIG. 1, there are two groups which are also referred to as group 1 and group 2 herein below and where the luminaires 1a-d are assigned to group 1 and the luminaires 2a-e are assigned to group 2. In addition, there may be further groups, which are not shown in the figure. The assignment of the luminaires 1a-d, 2a-e to the groups may be made in a way known to the person skilled in the art as such and in accordance with the requirements of the application in which the luminaires 1a-d, 2a-e are used. For instance, each group may include luminaires 1a-d, 2a-e illuminating a particular area of a building, such as a particular room or part of a room, or public space, such as a section of a street, which differs from the area illuminated by the luminaires 1a-d, 2a-e of the other group(s).

For controlling the luminaires 1a-d, 2a-e, control devices are provided. In particular, these control devices may be used for controlling the lighting levels of the luminaires. At least some of the control devices are provided for a joint control of the lighting levels of each group, so that the luminaires 1-d, 2a-e of each group are in synchronization with each other in the normal operation of the luminaires, i.e. if no failures occur and if individual luminaires are not controlled in another way, as will be explained further below.

In one embodiment, the control devices for jointly controlling the luminaires 1a-d, 2a-e include occupancy sensors 3. These are sensors which are capable of detecting the presence of persons in a monitored area on the basis of their intrinsic features, such as the heat generated by the persons, their natural motion and/or their shape. Such occupancy sensors 3 are known to the person skilled in art as such and may be configured as infrared sensors (for detecting the heat emitted by persons), motion detectors or cameras, for example.

For controlling the luminaires 1a-d, 2a-e, one or more occupancy sensor(s) 3 may be assigned to each group of luminaires 1a-d, 2a-e, and the occupancy sensor(s) 3 assigned to a group may monitor a certain area assigned to this group. This area may at least approximately correspond to the area illuminated by the luminaires 1a-d, 2a-e of the group. Further, the occupancy sensor(s) 3 assigned to a group may be configured as separate devices communicating with the luminaires via the communication network, or it/they may be integrated into one or more luminaire(s) 1*a-d*, 2*a-e* of the relevant group as shown by way of example for the luminaire 1*a* in FIG. 1, which includes an occupancy sensor 3.

Preferably, the occupancy sensors 3 do not explicitly command the luminaires 1*a-d*, 2*a-e* to set a particularly lighting level. Rather, each occupancy sensor 3 may notify about a detected occupancy of its monitored area, and the luminaires 1*a-d*, 2*a-e* may set their lighting levels in response to such notifications in accordance with a predefined rule. In accordance with an exemplary rule, which will also be referred to herein below, the luminaires 1*a-d*, 2*a-e* of the group to which the occupancy sensor 3, which detected an occupancy, is assigned, shall set their lighting level to a high value X, which may be between 70% and 100% of their maximum lighting level, for example, and the luminaires of the neighboring group shall set their lighting level to a lower value Y, which may be between 20% and 50% of their maximum lighting level, for example.

When a separate occupancy sensor 3 detects an occupancy of its monitored area, it may transmit a corresponding control message notifying about the detection to the luminaires 1*a-d*, 2*a-e* via the communication network and the luminaires 1*a-d*, 2*a-e* react to the control message in accordance with the rule. In case the occupancy sensor 3 is integrated into a luminaire 1*a-d*, the control message notifying about the detection may be sent by the luminaire 1*a-d*, 2*a-e* and, in addition, the luminaire 1*a-d*, 2*a-e* may set its lighting level to the high value X in accordance with the rule, while the other luminaires react to the message according to the rule. In the following, the control messages notifying about the detection of an occupancy are also referred to as occupancy messages.

An occupancy message may be sent in a broadcast mode, i.e. it is addressed to all luminaires 1*a-d*, 2*a-e* of the network. Alternatively, an occupancy message may be sent in a groupcast mode, i.e. addressed to all luminaires 1*a-d*, 2*a-e* of a particular group, to group 1 in one transmission and to the neighboring group 2 in another transmission. In any case, the occupancy message may identify the group to which the occupancy sensor 3, which detected the occupancy, is assigned. This information is used by the luminaires 1*a-d*, 2*a-e* receiving an occupancy message to set their lighting levels in accordance with the predefined rule. In case of the aforementioned exemplary rule, a luminaire receiving the control message, sets its lighting level to the high value X, if it belongs to the same group as the occupancy sensor 4, which detected the occupancy. Otherwise, if the luminaire belongs to another group, it sets its lighting level to the lower value Y.

While the occupancy sensors 3 are used for a joint control of the luminaires 1*a-d*, 2*a-e* of the different groups, further control devices may be provided for individually controlling one or more particular luminaire(s) 1*a-d*, 2*a-e*. These control devices may include one or more user interaction (UI) elements 4, such as switches or graphical user interfaces. The control devices may allow a user to input level commands for instructing the associated luminaires 1*a-d*, 2*a-e* to set a desired lighting level and/or they may allow for inputting other commands that prompt the associated luminaires 1*a-d*, 2*a-e* to set a particular lighting level. An example of such a command is the command for activating a luminaire 1*a-d*, 2*a-e*, which has previously been inactive, where the luminaire 1*a-d*, 2*a-e* may set a predefined initial lighting level upon the activation.

The UI elements 4 for individually controlling particular luminaires 1*a-d*, 2*a-e* may be integrated into these luminaires 1*a-d*, 2*a-e*, as shown by way of example for the luminaire 1*b* in FIG. 1, which includes a UI element 4. Upon an actuation of such an UI element 4 by a user, a control command may be generated by the UI element 4, which may explicitly or implicitly specify a particular lighting level as described above, and the control command may be internally forwarded to a control circuit of the luminaire 1*a-d*, 2*a-e*, which sets the lighting level of the luminaire 1*a-d*, 2*a-e* in accordance with the control command. Likewise, UI elements 4 for individually controlling particularly the luminaires 1*a-d*, 2*a-e* may be configured as separate devices. Upon actuation, these UI elements 4 likewise generate control commands specifying the desired lighting level input by the user. However, each control command is transmitted to the target luminaire 1*a-d*, 2*a-e* using a suitable communication medium. In particular, it may be transmitted to the target luminaire 1*a-d*, 2*a-e* over the communication network using a unicast transmission. Such a transmission is made using a message which is addressed only to the relevant luminaire 1*a-d*, 2*a-e* and which is only processed by this luminaire 1*a-d*, 2*a-e* and ignored by the other luminaires 1*a-d*, 2*a-e*.

In one embodiment, an individually controllable luminaire 1*a-d*, 2*a-e* may react to both the occupancy messages and the control commands of the associated UI element 4. At each point in time, the lighting level of the luminaire 1*a-d*, 2*a-e* may be determined by the last command received, which may be an occupancy message or a control command of the UI element 4. In addition or as an alternative, a luminaire 1*a-d*, 2*a-e* may be configurable such that it only reacts to the control commands for a certain period of time and returns to its previous lighting level set before receipt of the command or to a predefined default lighting level upon the expiration of the time period.

Turning back to the joint control of the luminaires 1*a-d*, 2*a-e* by means of the occupancy messages, the desired synchronization of the luminaires 1*a-d*, 2*a-e* in groups is only achieved, when the luminaires 1*a-d*, 2*a-e* correctly receive and process the occupancy messages. However, as already described above, this will not always be the case, particularly because individual luminaires 1*a-d*, 2*a-e* may not correctly receive each occupancy message due to routing failures in the communication network or due to other reasons. As a result, an undesired de-synchronization of the luminaires 1*a-d*, 2*a-e* may occur. In view of this, a procedure for detecting and correcting a de-synchronization of a luminaire 1*a-d*, 2*a-e* with respect to its group is suggested. In the following description of embodiments of this procedure, it is assumed by way of example that the procedure is carried out by the luminaire 1*d* included in group 1.

In order to detect a de-synchronization with respect to the further luminaires 1*a-c* of its group and correct the de-synchronization, if necessary, the luminaire 1*d* evaluates status messages received from other luminaires 1*a-c*, 2*a-e*. The status message originating from a particular luminaire 1*a-c*, 2*a-e* includes status information indicating a current status of this luminaire 1*a-c*, 2*a-e*. In particular, the status information indicates the current lighting level of the luminaire 1*a-c*, 2*a-e*. Further, the status message originating from a particular luminaire 1*a-c*, 2*a-e* includes trigger information about a trigger that prompted the luminaire 1*a-c*, 2*a-e* to adopt the current status including the current lighting level.

The trigger information for a luminaire 1*a-c*, 2*a-e* is particularly indicative of whether the trigger for the luminaire 1*a-c*, 2*a-e* relates to all luminaires 1*a-c*, 2*a-e* of its group or is only valid for the respective luminaire 1*a-c*, 2*a-e*, and it preferably also specifies the reason for the trigger. Possible exemplary trigger reasons that may be specified in the trigger information include:

(a) "Local occupancy": A detection of an occupancy by an occupancy sensor 3 assigned to the group to which the respective luminaire 1*a-c*, 2*a-e* belongs (b) "Neighboring occupancy": A detection of an occupancy by an occupancy sensor 3 assigned to a neighboring group, and (c) "Individual control": An individual control of the luminaire, e.g. by means of a UI element 4.

When a luminaire 1*a-d*, 2*a-e* changes its status as a result of a detected de-synchronization, as will be explained herein below, a further trigger reason may be assigned to this change, which specifies that the luminaire 1*a-d*, 2*a-e* has corrected its status.

As will be appreciated, the aforementioned trigger reasons are often also indicative of whether the trigger relates to all luminaires 1*a-c*, 2*a-e* of a group or only to an individual luminaire 1*a-c*, 2*a-e*. So, local and neighboring occupancies are trigger reasons relating to a whole group of luminaires 1*a-c*, 2*a-e* while an individual control is a trigger reason only relating to a single luminaire 1-*ac*, 2*a-e*. Therefore, the trigger information may not necessarily include further data indicating whether the trigger relates to all luminaires 1*a-c*, 2*a-e* of a group or to an individual luminaire.

However, the trigger information may optionally further indicate a reception mode of the command and/or message that prompted the luminaire 1*a-c*, 2*a-e* to adopt the current status, where possible reception modes include (a) "Internal generation": An internal generation of the command setting the current status (e.g. in response to an input to an internal UI element 4 or a detection signal of an internal occupancy sensor 3), (b) "Unicast": A reception of a unicast transmission (e.g. from a separate UI element 4), (c) "Groupcast": A reception of a groupcast transmission, or (d) "Broadcast": A reception of a broadcast transmission.

The reception mode may likewise be considered in order to determine a desynchronization of a luminaire. This is particularly advantageous in lighting systems in which the trigger reason alone is not always indicative of whether the trigger relates to all luminaires 1*a-c*, 2*a-e* of a group or only to an individual luminaire 1*a-c*, 2*a-e*. For instance, this may be the case in a lighting system, in which the luminaires 1*a-c*, 2*a-e* can be controlled using manual control commands which override control commands received from occupancy sensors 3 and which can be addressed either to an individual luminaire 1*a-c*, 2*a-e* via unicast transmission or to a whole group of luminaires 1*a-c*, 2*a-e* via groupcast transmission. In this case, the trigger reason "manual override" is not indicative of whether the trigger relates to all luminaires 1*a-c*, 2*a-e* of a group or only to an individual luminaire 1*a-c*, 2*a-e* and the reception mode may additionally be taken into consideration in order to determine whether the trigger relates to all luminaires 1*a-c*, 2*a-e* of a group or only to an individual luminaire 1*a-c*, 2*a-e*.

In addition to the trigger information including the trigger reason and optionally including the reception mode, a status message originating from a particular luminaire 1*a-c*, 2*a-e* may indicate the group to which the luminaire 1*a-c*, 2*a-e* belongs.

For obtaining the status messages, the luminaire 1*d* may retrieve them from the other luminaires 1*a-c*, 2*a-e* b by sending one or more polling messages, which the other luminaires 1*a-c*, 2*a-e* answer by sending the status messages. The status messages may be retrieved upon the expiration of a predefined time period from the last correct receipt of an occupancy message and/or in predefined intervals, for example.

As will be understood from the further discussion herein below, the luminaire 1*d* firstly evaluates the status messages from the other luminaires 1*a-c* of its own group 1 and optionally evaluates the status messages from the luminaires 2*a-e* of the other group 2 under certain conditions. In view of this, the luminaire 1*d* may firstly retrieve status messages only from the luminaires 1*a-c* of its own group 1, and it may then optionally retrieve status messages from the luminaires 2*a-e* of the other group 2, if required. For retrieving the status message from the luminaires 1*a-c*, 2*a-e* of each group, the luminaire 1*d* may send a polling message to the luminaires 1*a-c*, 2*a-e* of the respective group via a groupcast transmission. As an alternative, the luminaire 2*c* may only send one polling message to all luminaires 1*a-c*, 2*a-e* via a broadcast transmission and firstly store the status messages received from the luminaires 2*a-e* of group 2 without a further processing. These status messages may then be evaluated later, if necessary; or they may be discarded. In both implementations, i.e. in case of groupcast and broadcast transmissions of the polling messages, the status messages may be sent by other luminaires 1*a-c*, 2*a-e* via a unicast transmission to the luminaire 1*d* that sent the polling message.

The broadcast transmission of the polling message can result in unnecessary transmissions of status messages. However, a broadcast transmission is also possible if the luminaire 1*d* does not know the groupcast addresses for groupcast transmissions to the luminaires 1*a-c* of its own group 1 and the luminaires 2*a-e* of the neighboring group 2. Therefore, a groupcast transmission of the polling messages may be preferred in case the luminaires 1*a-d*, 2*a-e* dispose of the groupcast addresses of their own group and the neighboring group. Otherwise, the polling messages may be sent via broadcast transmission.

Figure 2:
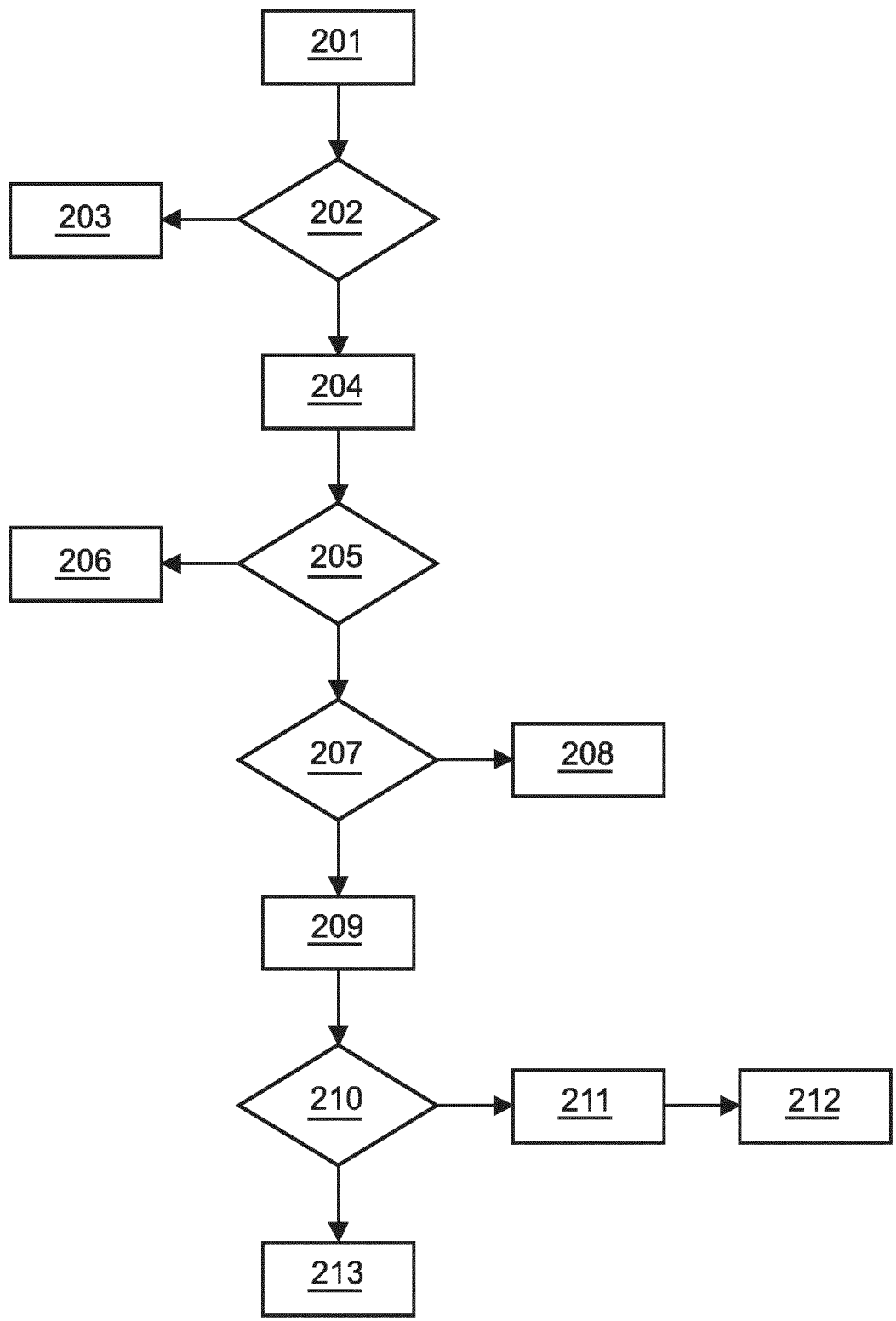

In the following, further steps of embodiments of the procedure for detecting and correcting a de-synchronization of the luminaire 1*d* with respect to the other luminaires 1*a-c* of group 1 are described by making reference to FIG. 2 (in addition to FIG. 1):

Upon having received at least the status messages of the other luminaires 1*a-c* of its own group 1 (step 201), the luminaire 1*d* checks whether all status messages include identical status information and whether the status indicated in the status information equal its own status (step 202). In particular, the luminaire 1*d* checks whether the current lighting levels of the other luminaires 1*a-c* of its own group 1 are identical and equal to its own current lighting level. If this is the case, the luminaire 1*d* determines that it is synchronized with the other luminaires of its group 1 and the procedure ends (step 203).

If the luminaire 1*d* determines in step 202 that the status of the other luminaires 1*a-c* of its own group 1 are not identical and/or that its own status is not equal to the status of the other luminaires 1*a-c* of its own group 1, it proceeds with evaluation of the trigger information included in the status messages received from the luminaires 1*a-c* of its own group 1. On the basis of this evaluation, the luminaire 1*d* selects the status messages which are further processed to detect a de-synchronization with the other luminaires 1*a-c* of its group 1 and to correct the de-synchronization, if necessary. In particular, it selects the status messages that do not include trigger information indicating a trigger that is only valid for the luminaire 1a-c having sent the relevant status information (step 204). The luminaires 1a-c which have adapted their current status in response to such a trigger are intentionally not synchronized with the other luminaires 1a-d of their group. Therefore, their status messages are ignored in the detection and correction of a de-synchronization.

In one exemplary embodiment, the evaluation of the status information comprises that the luminaire 1d checks whether the status messages received from the other luminaires 1a-c of its own group 1 include trigger information indicating an "individual control" as trigger reason and/or a "unicast" reception mode. Such trigger information is indicative of a trigger that is only valid for the luminaire 1a-c having sent the respective status messages. Therefore, the luminaire 1d ignores the status messages including such trigger information in the further procedure, and only the status messages not including such trigger information are selected for the further processing.

In the next step of the procedure, the luminaire 1d evaluates the status message selected in the preceding step. In so doing, it may particularly evaluate the status information included in the status messages and may compare the indicated status with its own status. This may comprise a check whether the status messages include identical status information and whether the status indicated therein is equal to its own status (step 205). In particular, the luminaire 1d may check whether the lighting levels indicated in the selected messages are identical and equal to its own current lighting level. If this is the case, the luminaire 1d determines that it is synchronized with the other luminaires 1a-c of its group 1, which are not individually controlled, and the procedure ends (step 206).

If the luminaire 1d determines in step 205 that the status information included in the selected status messages are not identical and/or the indicated status are not equal to its own status, it is to be assumed that the group 1 of luminaires 1a-d is out of synchronization unintentionally. In this case, the luminaire 1d may check in the next step whether a number of the selected status messages, which is greater than a predefined threshold, indicate identical status, particularly identical lighting levels (step 207). The predefined threshold may correspond to a predefined percentage of the selected status messages, which is preferably greater than 50% and which may particularly be between 55% and 70%.

If a number of the selected status messages, which is greater than a predefined threshold, indicate identical status, the luminaire 1d may additionally check in an optional configuration, whether all of these status messages or a subset thereof, which still includes a number of status messages greater than the threshold, indicates trigger reasons corresponding to each other. In this check, trigger reasons may be regarded as corresponding to each other if they are identical or if they do not conflict with each other. This may particularly be the case if they can coexist in a group of synchronized luminaires 1a-c, 2a-e. Trigger reasons corresponding to each other may particularly be assumed when one status message indicates a correction of the status as trigger reason. This trigger reason may be regarded as corresponding to a trigger reason indicating a local or neighboring occupancy.

If the luminaire 1d determines in step 207 that a number of the selected status messages above the predefined threshold include identical status information, particularly identical lighting levels, and optionally also trigger reasons, which correspond to each other, the luminaire 1d compares its own status to the status indicated in the relevant status messages and changes its status to the indicated status if there is a discrepancy (step 208). In particular, the luminaire 1d compares its lighting level with the lighting level indicated in these status messages and changes its lighting level to the indicated lighting in case of a discrepancy. This behavior of the luminaire 1d is due to the fact that there is a high likelihood that the identical status indicated in the relevant status messages corresponds to the correct status desired for the jointly controlled luminaires 1a-d. If the trigger reasons are additionally considered, the desired status for the luminaire 1d can be correctly determined with an even higher likelihood. In case of a change of its status, particularly of its lighting level, the luminaire 1d may further memorize the correction as a trigger reason for the change—this trigger reason is included in status messages sent by the luminaire 1d to other luminaires 1a-c, 2a-e upon the change. Thereupon, the procedure ends.

In a first exemplary scenario, in which the procedure described so far may be applied, it may be assumed that the current lighting level of the luminaire 1d is Y, that the aforementioned threshold is 60% and that status messages received by the luminaire 1d from the other luminaires of group 1 include the following status and trigger information:

| Luminaire | Lighting Level | Trigger reason | Reception mode |
|---|---|---|---|
| 1a | Y | Neighboring occupancy | Groupcast |
| 1b | Y | Neighboring occupancy | Groupcast |
| 1c | X | Local occupancy | Internal generation |

In this scenario, the luminaire 1d selects all status messages for a further processing in step 204 of the procedure and determines in step 207 that more than 60% of the selected status messages indicate the identical lighting level Y. Since this lighting level is identical to its own lighting level, the luminaire 1d does not have to change its own lighting level in step 208 and the procedure ends without such a change.

In a second exemplary scenario, in which the procedure may be applied, it may again be assumed that the current lighting level of the luminaire 1d is Y and that the aforementioned threshold is 60%. Moreover, it may be assumed that status messages received by the luminaire 1d from the other luminaires of group 1 include the following status and trigger information:

| Luminaire | Lighting Level | Trigger reason | Reception mode |
|---|---|---|---|
| 1a | Y | Neighboring occupancy | Groupcast |
| 1b | X | Local occupancy | Groupcast |
| 1c | X | Local occupancy | Internal generation |

In this scenario, the luminaire 1d again selects all status messages for a further processing in step 204 of the procedure. Further, it determines in step 207 that more than 60% of the selected status messages indicate the identical lighting level X. Since this lighting level differs from its own lighting level, the luminaire 1d changes its own lighting level to the lighting level X in step 208.

Turning back to the above description of step 207, it will be appreciated that there will not always be a number of the selected status messages above the predefined threshold, which include identical status information. If the luminaire 1d determines in step 207 that this is not the case, the procedure may be aborted in one embodiment. Thereupon, it may be repeated at a later time. Since the other luminaires 1a-c of the group 1 also perform the procedure for detecting and correcting a de-synchronization, one or more of them may have corrected their status at a later time so that the procedure may lead to a different (better) result for the luminaire 1d.

In further embodiments, the luminaire 1d may evaluate status messages from the luminaires 2a-e of the neighboring group 2 in the next steps of the procedure, if the check in step 207 is not affirmative. As described above, these status messages may be newly retrieved for this purpose or they may have been retrieved previously together with the status messages from the luminaires 1a-c of the group 1. In the evaluation of the status messages from the luminaires 2a-e of the neighboring group 2, the luminaire 1d may again select those status messages that do not include trigger information indicating a trigger that is only valid for the luminaire 2a-e having sent the relevant status information (step 209). This selection may be made in a way already described above in connection with step 204 with respect to the status messages received form the luminaires 1a-c of the own group of luminaire 1d.

Upon the selection, the luminaire 1d may check whether a number of selected status messages from the luminaires 1a-c, 2a-e of the neighboring group 2, which is greater than a predetermined threshold, include identical status information and, optionally, trigger reasons corresponding to each other in step 210, where corresponding trigger reasons are determined in a similar way as described above. In an alternative embodiment of step 210, the luminaire 1d may check whether a number of selected status messages from its own group 1 and the neighboring group 2, which is greater than a predetermined threshold, include trigger information agreeing with each other, particularly corresponding trigger reasons agreeing with each other. For the status messages from luminaires 1a-c, 2a-e of one group, trigger information may have to be identical in order to be regarded as agreeing with each other. Optionally, trigger reasons, which do not conflict with each other, may be regarded as agreeing with to each other, as described above with respect to the correspondence of trigger reasons. For status messages from luminaires 1a-c, 2a-e of different groups, the trigger reasons do not have to be identical in order to be regarded as agreeing with each other. For such status messages, the included trigger information has to be in agreement in order for them to be regarded as corresponding to each other. This is particularly the case for status messages from luminaires 1a-d, 2a-e of one group, which indicate the trigger reason "local occupancy", and status messages 1a-d, 2a-e of the other group, which indicate the trigger reason "neighboring occupancy".

If the check in step 210 is affirmative, the luminaire 1d determines trigger information relating to its own group on the basis of the trigger information included in the relevant status messages and derives a status, particularly a lighting level, from the determined trigger information using the predefined rule (step 211). If the relevant status messages received from the luminaires 1a-c of its own group 1 include the trigger reason "local occupancy" and the relevant status messages received from the luminaires 2a-e of the other group 2 include the trigger reason "neighboring occupancy", the luminaire 1d particularly determines the trigger reason "local occupancy" in step 211 and derives a lighting level of value X from this trigger reason. If the relevant status messages received from the luminaires 1a-c of its own group 1 include the trigger reason "neighboring occupancy" and the relevant status messages received from the luminaires 2a-e of the other group 2 include the trigger reason "local occupancy", the luminaire 1d particularly determines the trigger reason "neighboring occupancy" in step 211 and derives a lighting level of value Y from this trigger reason.

Thereupon, the luminaire compares the derived status with its own current status and changes its status to the derived status in case of a discrepancy (step 212). In case of a change, the luminaire 1d may again memorize the correction as a trigger reason for the change—so that this trigger reason is included in status messages sent by the luminaire 1d to other luminaires 1a-c, 2a-e upon the change. Then, the procedure ends.

In case the check in step 210 is not affirmative, the procedure ends without a change of the status of the luminaire 1d (step 213). As described above, it may be repeated at a later time. When one or more of luminaires 1a-d, 2a-e may have corrected their status at that time, the repeated procedure may lead to a different (better) result for the luminaire 1d.

Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality.

A single unit or device may fulfill the functions of several items recited in the claims. The mere fact that certain measures are recited in mutually different dependent claims does not indicate that a combination of these measures cannot be used to advantage.

A computer program may be stored/distributed on a suitable medium, such as an optical storage medium or a solid-state medium, supplied together with or as part of other hardware, but may also be distributed in other forms, such as via the Internet or other wired or wireless telecommunication systems.

Any reference signs in the claims should not be construed as limiting the scope.

The invention claimed is:

1. A luminaire connectable to a plurality of further luminaires allocated to at least one group via a network, the luminaire being configured to:
   receive a status message from each of the further luminaires, each status message including:
   status information indicating a current status, comprising a current light level, of the respective luminaire, and
   trigger information about a trigger that prompted the respective luminaire to adopt the current status, wherein the trigger information is indicative of whether the trigger relates to all luminaires of a group or is only valid for the respective luminaire,
   select at least some of the received status messages that include trigger information indicative of a trigger relating to all luminaires of the allocated group and which do not include trigger information indicative of a trigger that is only valid for the luminaire having sent the respective status messages, compare the current light level of each of the respective luminaires as indicated in the selected status messages to each other and to the light level of the luminaire itself, check whether a number of the selected status messages, which is greater than a predetermined threshold, include identical status information and/or corresponding trigger information corresponding to each other, and change the light level of the luminaire to a light level selected in accordance with this status information or trigger information if the check is affirmative.

2. The luminaire as defined in claim 1, wherein the luminaire is included in an allocated group and is configured to select status messages for the comparison, which include trigger information indicative of a trigger relating to all luminaires of the allocated group and which do not include trigger information indicative of a trigger that is only valid for the luminaire having sent the respective status messages.

3. The luminaire as defined in claim 1, wherein the information indicative of a trigger that is only valid for one further luminaire having sent the status information specifies a reception of a message via a unicast transmission and/or a manual control input relating to the respective luminaire.

4. The luminaire as defined in claim 1, configured to retrieve the status messages from the further luminaires by transmitting a related request to the further luminaires via a multicast transmission.

5. The luminaire as defined in claim 1, configured to:

obtain status messages from further luminaires not assigned to the allocated group, and to change the light level of the luminaire at least on the basis of these status messages.

6. The luminaire as defined in claim 5, configured to:

select status messages from the further luminaires not assigned to the allocated group, which do not include trigger information indicative of a trigger that is only valid for the luminaire having sent the respective status messages, and to:

change the light level of the luminaire on the basis of the selected status messages received from the further luminaires not assigned to the allocated group.

7. The luminaire as defined in claim 6, configured to:

check whether a number of the selected status messages greater than a predetermined threshold include trigger information agreeing with each other, and to;

change its status to a new status selected in accordance with this trigger information, if the check is affirmative.

8. The luminaire as defined in claim 1, connectable to the plurality of further luminaires via a distributed communication network, particularly a mesh network.

9. A method for changing a light level of a luminaire connectable to a plurality of further luminaires allocated to at least one group via a network, the method comprising:

receiving a status message from each of the further luminaires, each status message including status information indicating a current status, comprising a current light level, of the respective luminaire and trigger information about a trigger that prompted the respective luminaire to adopt the current status, wherein the trigger information is indicative of whether the trigger relates to all luminaires of a group or is only valid for the respective luminaire, selecting at least some of the received status messages that include trigger information indicative of a trigger relating to all luminaires of the allocated group and which do not include trigger information indicative of a trigger that is only valid for the luminaire having sent the respective status messages, comparing the current light level of each of the respective luminaires as indicated in the selected status messages to each other and to the light level of the luminaire itself; and checking whether a number of the selected status messages, which is greater than a predetermined threshold, include identical status information and/or corresponding trigger information corresponding to each other, and changing the light level of the luminaire to a light level selected in accordance with this status information or trigger information if the check is affirmative.

\* \* \* \* \*